United States Patent
Valiyattil (10) Patent No.: US 10,511,154 B2
(45) Date of Patent: Dec. 17, 2019

(54) ELECTRICAL SWITCHGEAR SYSTEM

(71) Applicant: ABB Schweiz AG, Baden (CH)

(72) Inventor: Babu Sankar Valiyattil, Lake Mary, FL (US)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/467,568

(22) Filed: Mar. 23, 2017

(65) Prior Publication Data
US 2018/0278031 A1    Sep. 27, 2018

(51) Int. Cl.
*H02B 1/30* (2006.01)
*H02B 1/56* (2006.01)
*H01H 9/02* (2006.01)

(52) U.S. Cl.
CPC .............. *H02B 1/306* (2013.01); *H01H 9/02* (2013.01); *H02B 1/565* (2013.01)

(58) Field of Classification Search
CPC .......... H01H 9/02; H02B 1/565; H02B 1/306; H01B 13/025
See application file for complete search history.

(56) References Cited

U.S. PATENT DOCUMENTS

| | | | | |
|---|---|---|---|---|
| 4,528,614 A * | 7/1985 | Shariff | ................. | H02B 1/36 165/104.33 |
| 5,574,624 A * | 11/1996 | Rennie | ................. | H02B 1/56 200/289 |
| 6,135,875 A * | 10/2000 | French | ................. | H02B 1/565 361/695 |
| 6,417,443 B1 * | 7/2002 | Smith | ................. | H02B 1/565 174/17 VA |
| 7,952,857 B1 * | 5/2011 | Motley | ................. | H02B 3/025 361/678 |
| 9,899,810 B2 * | 2/2018 | Pawar | ................. | H02B 13/025 |
| 2004/0007348 A1 * | 1/2004 | Stoller | ................. | H02B 1/565 165/47 |
| 2005/0207085 A1 * | 9/2005 | Jur | ................. | H01H 9/342 361/129 |
| 2006/0225449 A1 * | 10/2006 | Dorrich | ................. | H05K 7/20572 62/259.2 |
| 2009/0296321 A1 * | 12/2009 | Wantschik | ................. | H02B 1/565 361/677 |
| 2010/0258532 A1 * | 10/2010 | Miller | ................. | H02B 3/025 218/157 |
| 2012/0216393 A1 | 8/2012 | Ballard et al. | | |

(Continued)

FOREIGN PATENT DOCUMENTS

EP    0268137 A2    5/1988

OTHER PUBLICATIONS

Patent Cooperation Treaty International Search Report and Written Opinion dated Jun. 15, 2018, cited in counterpart PCT Patent Application No. PCT/US18/24071 (8 pages).

*Primary Examiner* — David M Sinclair
*Assistant Examiner* — Robert D Brown
(74) *Attorney, Agent, or Firm* — Taft Stettinius & Hollister LLP; J. Bruce Schelkopf (57) ABSTRACT

An electrical switchgear system includes a switchgear enclosure. The switchgear enclosure has a plurality of compartments housing switchgear components. The electrical switchgear system also includes a vent box. The vent box is in fluid communication with selected compartments of the plurality of compartments. The vent box is disposed on a side of the switchgear enclosure.

27 Claims, 3 Drawing Sheets

(56) References Cited

U.S. PATENT DOCUMENTS

| | | | |
|---|---|---|---|
| 2013/0083481 A1* | 4/2013 | Goto | H05K 7/20209 |
| | | | 361/695 |
| 2013/0160984 A1* | 6/2013 | Cash | G06F 1/20 |
| | | | 165/200 |
| 2013/0314850 A1* | 11/2013 | Takahashi | H02B 1/56 |
| | | | 361/678 |
| 2013/0327623 A1 | 12/2013 | Kozuru et al. | |
| 2014/0084763 A1* | 3/2014 | Doglio | H05K 7/1489 |
| | | | 312/223.2 |
| 2014/0120824 A1* | 5/2014 | Lin | H05K 7/1497 |
| | | | 454/184 |
| 2014/0131090 A1* | 5/2014 | Gingrich | H02B 1/565 |
| | | | 174/560 |
| 2014/0137500 A1* | 5/2014 | Letourneau | E04H 1/1238 |
| | | | 52/473 |
| 2014/0160636 A1* | 6/2014 | Rajvanshi | H05K 7/20581 |
| | | | 361/608 |
| 2015/0163957 A1 | 6/2015 | Martinez/Cruz et al. | |
| 2016/0042896 A1* | 2/2016 | Kingston | H01H 33/53 |
| | | | 218/157 |
| 2016/0043532 A1* | 2/2016 | Zende | H02B 3/025 |
| | | | 361/611 |
| 2016/0050940 A1* | 2/2016 | Gomez Jimenez | A21C 13/00 |
| | | | 99/468 |
| 2016/0143180 A1* | 5/2016 | Zhu | H05K 7/20572 |
| | | | 454/184 |
| 2016/0242315 A1* | 8/2016 | Pawar | H02B 1/56 |
| 2016/0249479 A1* | 8/2016 | Kanasaki | H05K 7/20736 |
| 2017/0063052 A1* | 3/2017 | Johnson | H02B 1/306 |
| 2017/0085063 A1* | 3/2017 | Johnson | H02B 1/565 |
| 2017/0117687 A1* | 4/2017 | Smith | H02B 1/56 |
| 2017/0149217 A1* | 5/2017 | Pawar | H02B 13/025 |

\* cited by examiner

FIG. 1

ELECTRICAL SWITCHGEAR SYSTEM

TECHNICAL FIELD

The present application generally relates to electrical systems, and more particularly, but not exclusively, to electrical switchgear systems.

BACKGROUND

Electrical switchgear systems remain an area of interest. Some existing systems have various shortcomings, drawbacks and disadvantages relative to certain applications. For example, in some electrical switchgear systems, the switchgear enclosure may not have sufficient cooling air to achieve a desired current rating. Accordingly, there remains a need for further contributions in this area of technology.

SUMMARY

One embodiment of the present invention is a unique switchgear system that includes a switchgear enclosure and two side vent boxes. Another embodiment is a unique switchgear system that includes a central switchgear apparatus disposed between two side vent boxes, and second and third switchgear apparatuses disposed on either side of the side vent boxes. Another embodiment is a unique switchgear system having a switchgear enclosure and a side vent box. Other embodiments include apparatuses, systems, devices, hardware, methods, and combinations for switchgear systems. Further embodiments, forms, features, aspects, benefits, and advantages of the present application shall become apparent from the description and figures provided herewith.

BRIEF DESCRIPTION OF THE FIGURES

The description herein makes reference to the accompanying drawings wherein like reference numerals refer to like parts throughout the several views, and wherein.

DETAILED DESCRIPTION OF THE ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Figure 1:
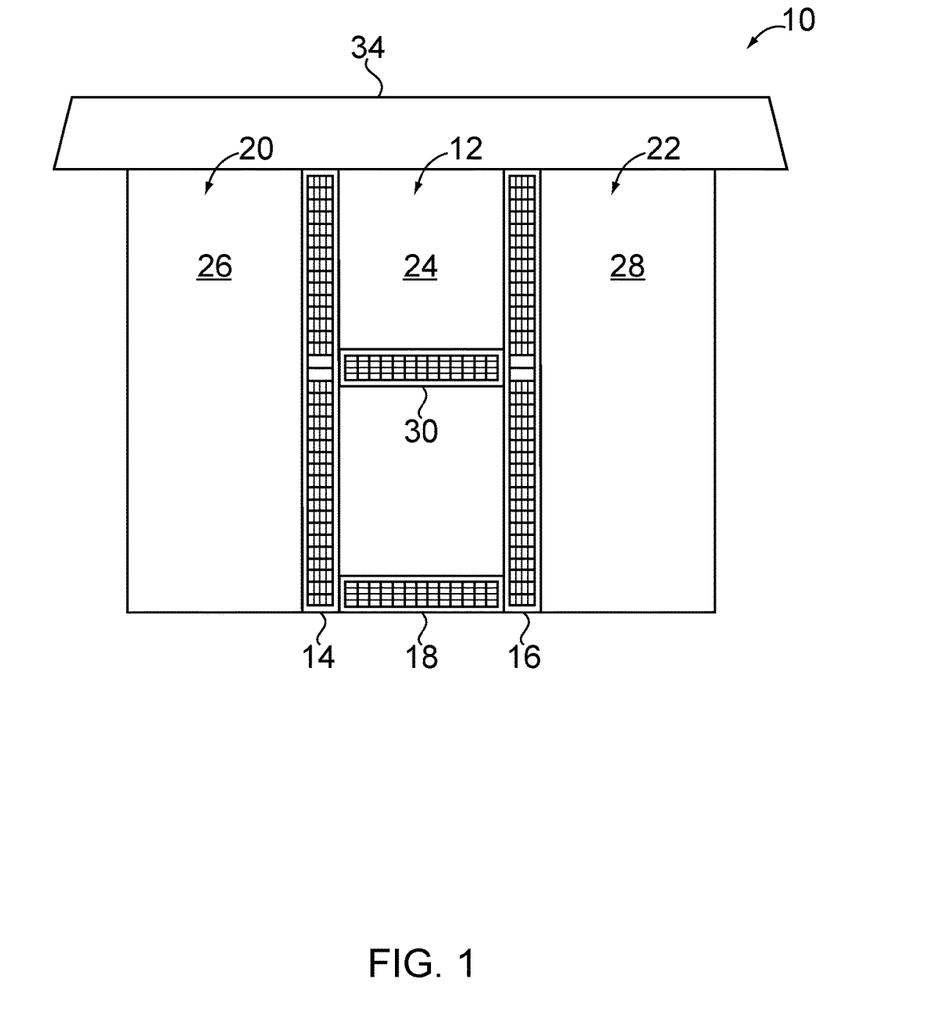
FIG. 1 schematically illustrates some aspects of a non-limiting example of a switchgear system in accordance with an embodiment of the present invention.

Referring to FIG. 1, some aspects of a non-limiting example of a switchgear system 10 in accordance with an embodiment of the present invention are schematically illustrated. Switchgear system 10 includes a high rated switchgear system 12, a side vent box 14, a side vent box 16, a bottom vent box 18, a normal rated switchgear system 20 and a normal rated switchgear system 22. High rated switchgear system 12 includes a switchgear enclosure or cabinet 24 having a plurality of segregated compartments for housing switchgear components (FIG. 2B). Normal rated switchgear systems 20 and 22 each include a switchgear enclosure or cabinet 26, 28 having a plurality of segregated compartments for housing switchgear components (not shown). Switchgear system 12 includes a center vent box 30 disposed within enclosure 24. In some embodiments, switchgear systems 20 and 22 may include center vent boxes (not shown). High rated switchgear system 12 has a higher current rating that the current ratings of normal rated switchgear system 20 and normal rated switchgear system 22. High rated switchgear system 12, normal rated switchgear system 20 and normal rated switchgear system 22 share a common set of bus bars. In some embodiments, switchgear system 12 achieves a higher current rating than switchgear systems 20, 22 due to the use of a cooling scheme or system 32, e.g., described herein below, which includes side vent box 14, side vent box 16, bottom vent box 18 and center vent box 30, along with the various vent openings that receive, transmit, and exhaust cooling air, e.g., as described herein. Some embodiments may include only a single side vent box, e.g., side vent box 14 or side vent box 16. In one form, high rated switchgear system 12, normal rated switchgear system 20 and normal rated switchgear system 22 are 3-phase systems. In other embodiments, one or more of switchgear system 12, switchgear system 20 and switchgear system 22 may be single phase or may be another multi-phase configuration. In one form, cooling system 32 is a natural convection system. In other embodiments, cooling system 32 may employ forced air convention in addition to or in place of natural convection.

The cooling systems/schemes employed by switchgear systems 20, 22 may vary with the needs of the application. In one form, used cooling air is exhausted from the top surfaces or walls of the switchgear enclosures into an exhaust plenum 34, which collects and vents the used or exhausted cooling air from switchgear systems 12, 20 and 22 to a desired location.

Figure 2A:
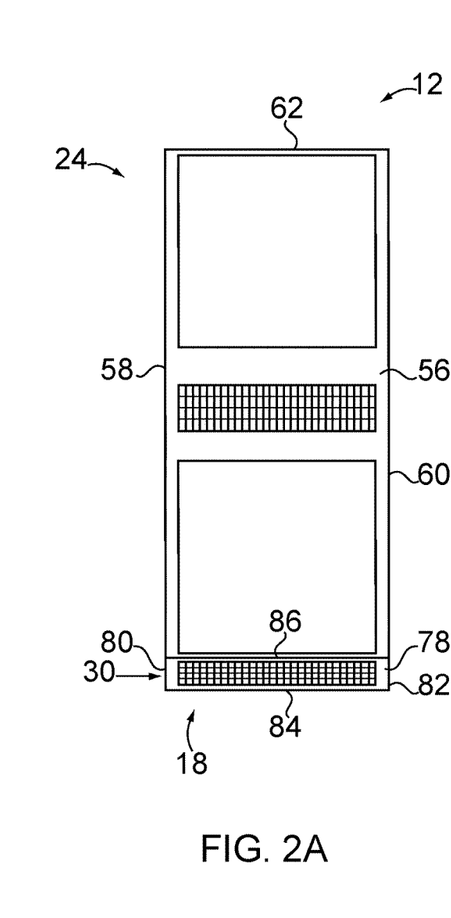
FIGS. 2A and 2B schematically illustrate some aspects of a non-limiting example of a switchgear system front view and side view in accordance with an embodiment of the present invention.
Figure 2B:
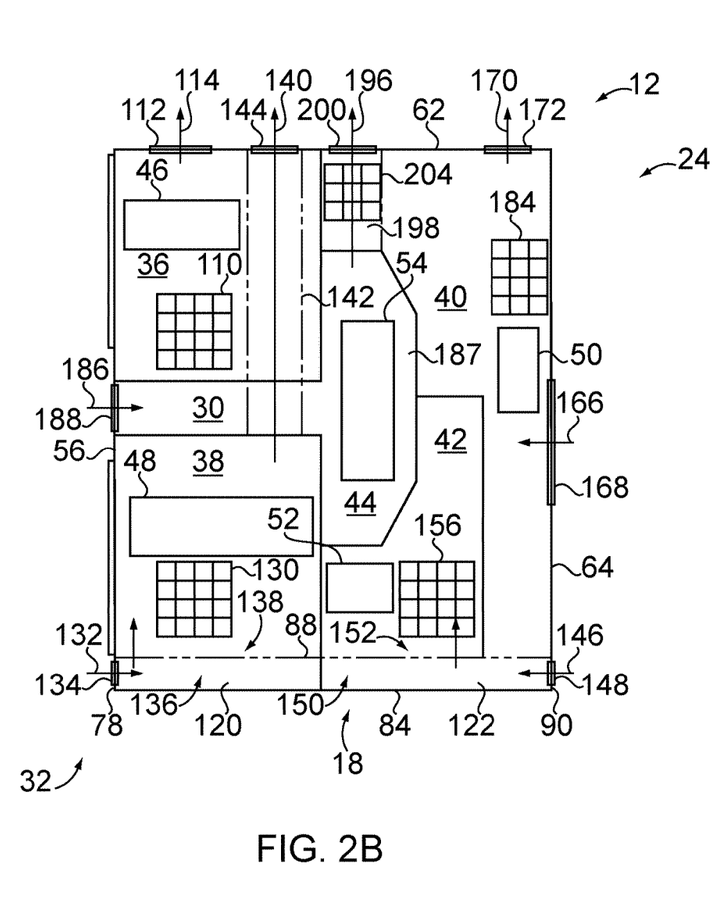

Referring also to FIGS. 2A, 2B, 3A and 3B, switchgear system 12 is illustrated with additional detail. Whereas only a single side vent box is illustrated in FIG. 2A and 2B, it will be understood that the side vent boxes in some embodiments are symmetrical about switchgear system 12, e.g., having vent chambers with locations that are mirror images of each other for interfacing with the same switchgear system 12 compartments in enclosure 24. In other embodiments, non-symmetric or non-mirror image configurations may also or alternatively be employed. The below description of side vent box 14 applies equally to side vent box 16.

High rated switchgear system 12 includes an upper circuit breaker compartment 36, a lower circuit breaker compartment 38, an upper cable compartment 40, a lower cable compartment 42 and a bus bar compartment 44 for housing switchgear components. In one form, upper circuit breaker compartment 36, lower circuit breaker compartment 38, upper cable compartment 40, lower cable compartment 42 and bus bar compartment 44 are segregated, e.g., isolated from each other and sealed to prevent an arc event from transmitting arc products into other compartments. In some embodiments, one or more compartments may not be segregated. Upper circuit breaker compartment 36 houses a circuit breaker system 46 with ancillary components, e.g., a vacuum circuit breaker system. Lower circuit breaker compartment 38 houses a circuit breaker system 48 with ancillary components, e.g., a vacuum circuit breaker system. Upper cable compartment 40 houses a cable system 50 with ancillary components. Lower cable compartment 42 houses a cable system 52 with ancillary components. Bus bar compartment 44 houses a bus bar system 54 that is a portion of a bus bar system shared by switchgear systems 12, 20 and 22, e.g., having bus bars supported and insulated by bushings between switchgear enclosure 28 and side vent box 14 (and/or switchgear enclosure 24 in some embodiments), and between switchgear enclosure 28 and side vent box 16 (and/or switchgear enclosure 24 in some embodiments). The locations of circuit breaker system 46, circuit breaker system 48, cable system 50, cable system 52 and bus bar system 54 illustrated in FIG. 2B are for the sake of convenience of illustration only, and do not reflect the actual locations of circuit breaker system 46, circuit breaker system 48, cable system 50, cable system 52 and bus bar system 54, which may vary with the needs of the application.

Enclosure 24 of high rated switchgear system 12 includes a front face 56, a side wall 58, a side wall 60, a top wall or surface 62, and a back wall 64. Side vent box 14 includes a front face 66, a side wall 68, a side wall 70, a bottom wall 72, a top wall or surface 74 and a back wall 76. Bottom vent box has a front face 78, a side wall 80, a side wall 82, a bottom wall 84, a top wall 86 disposed adjacent to a bottom wall 88 of enclosure 24, and a back wall or face 90.

Side bent box 14 is in fluid communication with upper circuit breaker compartment 36, lower circuit breaker compartment 38, upper cable compartment 40, lower cable compartment 42 and bus bar compartment 44. Side vent box 14 includes a plurality of vent chambers, one corresponding to each of upper circuit breaker compartment 36, lower circuit breaker compartment 38, upper cable compartment 40, lower cable compartment 42 and bus bar compartment 44. The vent chambers are an upper circuit breaker vent chamber 92, a lower circuit breaker vent chamber 94, an upper cable compartment vent chamber 96, a lower cable compartment vent chamber 98 and a bus bar vent chamber 100. In various embodiments, upper circuit breaker vent chamber 92, lower circuit breaker vent chamber 94, upper cable compartment vent chamber 96, lower cable compartment vent chamber 98 and bus bar vent chamber 100 are operative to conduct cooling air to or from respective upper circuit breaker compartment 36, lower circuit breaker compartment 38, upper cable compartment 40, lower cable compartment 42 and bus bar compartment 44 via vent openings, described below. In various embodiments, the vent openings may be slotted openings, slatted openings, latticed openings, louvered openings and/or other types of vent openings, e.g., fully open flow area formed by an opening of suitable size in the desired vent chamber or enclosure 24 compartment, without the use of slots, slats, louvers, etc. The locations of the vent openings are by way of schematic illustration only, and may vary with the needs of the application. For arc resistant switchgear applications, respective flap systems (not shown) may be included at suitable locations to avoid arc propagation during an arc event.

Figure 3A:
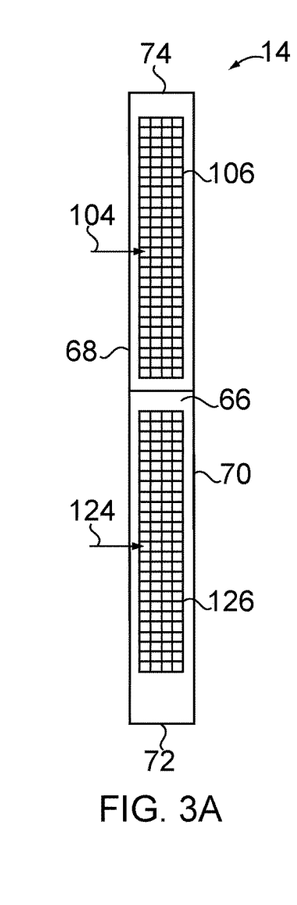
FIGS. 3A and 3B schematically illustrate some aspects of a non-limiting example of a side vent box front view and side view in accordance with an embodiment of the present invention.
Figure 3B:
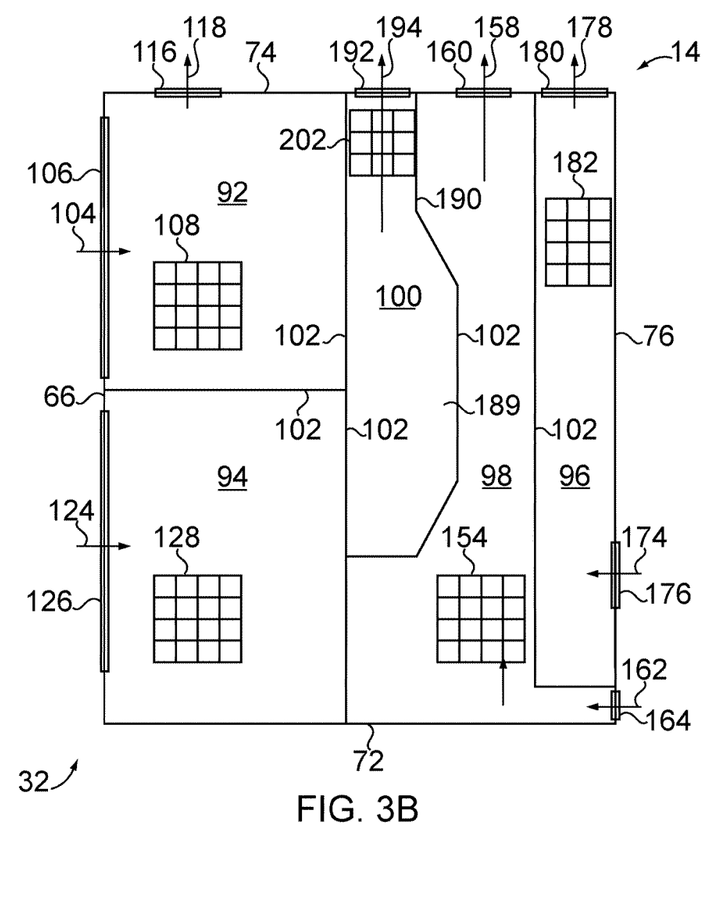

Each of the upper circuit breaker vent chamber 92, lower circuit breaker vent chamber 94, upper cable compartment vent chamber 96, lower cable compartment vent chamber 98 and bus bar vent chamber 100 have one or more vent openings operative to transmit the cooling air to or from a corresponding of the respective upper circuit breaker compartment 36, lower circuit breaker compartment 38, upper cable compartment 40, lower cable compartment 42 and bus bar compartment 44. Upper circuit breaker vent chamber 92, lower circuit breaker vent chamber 94, upper cable compartment vent chamber 96, lower cable compartment vent chamber 98 and bus bar vent chamber 100 are segregated, e.g., isolated from each other by metallic walls, e.g., walls 102. Bus bar vent chamber 100 in some embodiments includes bushings (not shown) mounted in openings (not shown) in side wall 68 for supporting and the common bus bars between switchgear systems 12, 20 and 22.

Upper circuit breaker vent chamber 92 receives cooling air 104 from a vent opening 106 in front face 66 of side vent box 14, and conducts the cooling air into upper circuit breaker compartment 36 through mating vent openings 108 and 110 disposed in respective side wall 70 of vent box 14 and side wall 58 of enclosure 24. In some embodiments, vent flaps may be employed to prevent reverse flow through vent openings 106, 108 and/or 110 during arc events. The received cooling air circulates and extracts heat from circuit breaker system 46 components. Used cooling air 114 is then exhausted from upper circuit breaker compartment 36 into exhaust plenum 34 via a vent opening 112 disposed in the top surface 62 of enclosure 24. Some embodiments may also include a vent opening 116 in top surface 74 of side vent box 14 for venting cooling air 118 into exhaust plenum 34, e.g., air which did not enter upper circuit breaker compartment 36, but which cools the enclosure 24 side wall 58 at the location of upper circuit breaker compartment 36. Cooling air 104 also provides a layer or cushion of cooler air between switchgear enclosures 24 and 26 in the vicinity of upper circuit breaker compartment 36, and may provide additional cooling to switchgear system 12 components, e.g., tulip contact systems.

Bottom vent box 18 includes two segregated vent chambers: a lower circuit breaker compartment vent chamber 120 and a lower cable compartment vent chamber 122. Lower circuit breaker compartment 38 receives cooling air from two sources. Lower circuit breaker vent chamber 94 receives cooling air 124 from a vent opening 126 in front face 66 of side vent box 14, and conducts the cooling air into lower circuit breaker compartment 38 through mating vent openings 128 and 130 disposed in respective side wall 70 of vent box 14 and side wall 58 of enclosure 24. Lower circuit breaker compartment vent chamber 120 receives cooling air 132 from a vent opening 134 in front face 78 of bottom vent box 18, and conducts the cooling air into lower circuit breaker compartment 38 through mating vent openings 136 and 138 disposed in respective top wall 86 of bottom vent box 18 and bottom wall 88 of enclosure 24. In some embodiments, vent flaps may be employed to prevent reverse flow through vent openings 126, 128, 130, 134, 136 and/or 138 during arc events.

The received cooling air circulates and extracts heat from circuit breaker system 48 components. Used cooling air 140 is then exhausted up a chimney 142 passing from the top of lower circuit breaker compartment 38, through center vent box 30, and through upper circuit breaker compartment 36 to a vent opening 144 in top surface 62 of enclosure 24. Chimney 142 is adjacent to side vent box 14. In some embodiments a second chimney 142 (not shown) is disposed on the opposite side of enclosure 24, e.g., adjacent to side vent box 16. The size, number and locations of chimneys 142 may vary with the needs of the application. The used cooling air is discharged from vent opening 144 into exhaust plenum 134. In some embodiments, some of the cooling air 124 may recirculate within lower circuit breaker vent chamber 94 and exit the chamber through the upper portion of vent opening 126, removing heat from the side wall 58 of enclosure 24. In any event, the cooling air 124 received into lower circuit breaker vent chamber 94 provides a layer or cushion of cooler air between switchgear enclosures 24 and 26 in the vicinity of lower circuit breaker compartment 38, which may provide additional cooling to switchgear system 12 components, e.g., tulip contact systems.

Lower cable compartment 42 receives cooling air from two sources. Lower cable compartment vent chamber 122 receives cooling air 146 from a vent opening 148 in back face or wall 90 of side vent box 14, and conducts the cooling air into lower cable compartment 42 through mating vent openings 150 and 152 disposed in respective top wall 86 of bottom vent box 18 and bottom wall 88 of enclosure 24. The received cooling air circulates and extracts heat from cable system 52 components. The cooling air then exits lower cable compartment 42—lower cable compartment vent chamber 98 conducts the cooling air from lower cable compartment 42, transmitting the cooling air through mating vent openings 154 and 156 disposed in respective side wall 70 of vent box 14 and side wall 58 of enclosure 24. Used cooling air 158 then proceeds upward through lower cable compartment vent chamber 98, and is then exhausted into exhaust plenum 34 through a vent opening 160 disposed in the top surface 74 of enclosure 24.

In addition, lower cable compartment vent chamber 98 receives cooling air 162 from a vent opening 164 in back wall or face 76 of side vent box 14, which proceeds upward through lower cable compartment vent chamber 122 and is exhausted into plenum 34 through vent opening 160. Cooling air 162 removes heat from the side wall 58 of enclosure 24, and provides a layer or cushion of cooler air between switchgear enclosures 24 and 26 in the vicinity of lower circuit breaker compartment 38, which may provide additional cooling to switchgear system 12 components. In some embodiments, vent flaps may be employed to prevent reverse flow through vent openings 148, 150, 152, 154, 156, and/or 164 during arc events.

Upper cable compartment 40 receives cooling air 166 from a vent opening 168 in back wall or face 64 of enclosure 24. The received cooling air circulates and extracts heat from cable system 50 components. Used cooling air 170 is exhausted into exhaust plenum 34 via a vent opening 172 disposed in top surface 62 of enclosure 24. Cooling air 174 is also received into upper cable compartment vent chamber 96 via a vent opening 176 disposed in the back face or wall 76 of side vent box 14. Cooling air 174 removes heat from the side wall 58 of enclosure 24, and providing a layer or cushion of cooler air between switchgear enclosures 24 and 26 in the vicinity of upper cable compartment 40, which may provide additional cooling to switchgear system 12 components. In some embodiments, additional used cooling air 178 may exhausted into exhaust plenum 34 via a vent opening 180 disposed in top surface 74 of side vent box 14. In some embodiments mating vent openings 182 and 184 disposed in respective side wall 70 of vent box 14 and side wall 58 of enclosure 24 allow cooling air cooling air conducted by upper cable compartment vent chamber 96 to vent into upper cable compartment 40 for cooling and subsequent exhausting through vent opening 172 as used cooling air 170. In some embodiments, mating vent openings 182 and 184 may also allow the exchange of cooling air, e.g., conducted to or from upper cable compartment vent chamber 96, to promote a natural balance of cooling air flow between upper cable compartment vent chamber 96 and upper cable compartment 40. In some embodiments, vent flaps may be employed to prevent reverse flow through vent openings 168, 176, 182 and/or 184 during arc events.

Center vent box 30 receives cooling air 186 from a vent opening 188 in front face 56 of enclosure 24. Center vent box 30 is open to bus bar compartment 44, and conducts the cooling air into bus bar compartment 44. Bus bar compartment 44 has a vent opening 187, and bus bar vent chamber 100 has a corresponding mating vent opening 189. Bus bar vent chamber 100 conducts cooling air from bus bar compartment 44 via vent openings 187 and 189. In one form, vent openings 187 and 189 are large open areas with no wall or other structure, e.g., slots, slats, lattices, louvers, or the like separating bus bar vent chamber 100 from bus bar compartment 44. In other embodiments, other forms of vent openings may be employed, e.g., slotted, slatted, latticed, louvered or other types of vent openings. Bus bar vent chamber 100 conducts some of the cooling air from bus bar compartment 44 upward through a chimney portion 190 of bus bar vent chamber 100 to a vent opening 192 in top surface 74 of side vent box 14 for venting used cooling air 194 into exhaust plenum 34. In addition, used cooling air 196 is vented directly from bus bar compartment 44 via a chimney 198 extending upward from bus bar compartment 44, through a vent opening 200 into exhaust plenum 34. Chimney 198 is disposed adjacent to side vent box 14. In some embodiments mating vent openings 202 and 204 disposed in respective side wall 70 of vent box 14 and side wall 58 of enclosure 24 may allow the exchange of used cooling air, e.g., conducted to or from bus bar vent chamber 100 to promote a natural balance of cooling air flow through chimney portion 190 and chimney 198. In some embodiments a second chimney 196 (not shown) is disposed on the opposite side of enclosure 24, e.g., adjacent to side vent box 16 e.g., and may include vent openings similar to mating vent openings 202 and 204 disposed in respective side wall 68 of vent box 14 and side wall 60 of enclosure 24. In some embodiments, vent flaps may be employed to prevent reverse flow through vent opening 188 during arc events.

Although vent openings have been described hereinabove with respect to locations on wall 70 of side vent box 14 adjacent to select vent chambers for mating with corresponding vent openings in side wall 58 of enclosure 24, it will be understood that in some embodiments, side vent box 16 and side wall 60 of enclosure 24 include similar and corresponding vent openings, providing a symmetric cooling scheme, i.e., the same cooling air flow paths on either side of enclosure 24 using side vent boxes 14 and 16 that are effectively mirror images of each other. In other embodiments, other cooling schemes may be employed, e.g., including asymmetric cooling schemes wherein different vent chambers in side vent boxes 14 and 16 are used for conducting cooling air to or from different enclosure 24 compartments on each side of enclosure 24 relative to the symmetric approach described herein.

Embodiments of the present invention include an electrical switchgear system, comprising: a switchgear enclosure having a plurality of compartments housing switchgear components; a first side vent box in fluid communication with first selected compartments of the plurality of compartments and disposed on a first side of the switchgear enclosure; and a second side vent box in fluid communication with second selected compartments of the plurality of compartments and disposed on an opposite side of the switchgear enclosure.

In a refinement, the first selected compartments are the same as the second selected compartments.

In another refinement, the first side vent box includes a first plurality of vent chambers operative to conduct cooling air to or from the first selected compartments, each vent chamber of the first plurality of vent chambers having a vent opening operative to transmit the cooling air to or from a corresponding compartment of the first selected compartments.

In yet another refinement, the second side vent box includes a second plurality of vent chambers operative to conduct cooling air to or from the second selected compartments, each vent chamber of the second plurality of vent chambers having a vent opening operative to transmit the cooling air to or from a corresponding compartment of the second selected compartments.

In a still further refinement, the electrical switchgear system further comprises a bottom vent box disposed at a bottom of the first switchgear enclosure and in fluid communication with third selected compartments of the plurality of compartments.

In a yet still further refinement, the bottom vent box includes a third plurality of vent chambers operative to conduct cooling air into the third selected compartments.

In a further refinement, the bottom vent box includes a front face and a back face; wherein the bottom vent box includes a vent opening disposed at each of the front face and the back face; wherein each vent opening is operative to receive the cooling air into at least one adjacent vent chamber of the plurality of vent chambers.

In a yet further refinement, the first side vent box and the second side vent box each include a front face, a back face and a plurality of vent chambers; wherein the first side vent box and the second side vent box each include a vent opening disposed at each of the front face and the back face and operative to receive cooling air into at least one adjacent vent chamber of the plurality of vent chambers.

In a still further refinement, the electrical switchgear system further comprises a center vent box disposed at least partially within the switchgear enclosure and operative to receive cooling air from in front of the switchgear enclosure and transmit the cooling air into at least one compartment of the plurality of compartments.

In a yet still further refinement, the first side vent box and the second side vent box each include a top surface and a plurality of vent chambers in fluid communication with the plurality of compartments; wherein the first side vent box and the second side vent box each include a plurality of vent openings disposed in the top surface and operative to discharge cooling air from adjacent vent chambers of the plurality of vent chambers.

Embodiments of the present invention include an electrical switchgear system, comprising: a central switchgear apparatus having a central switchgear enclosure with a plurality of segregated compartments housing switchgear components, the central switchgear system having a current rating; a first side vent box in fluid communication with first selected compartments of the plurality of segregated compartments and disposed adjacent to and on a first side of the switchgear enclosure; a second side vent box in fluid communication with second selected compartments of the plurality of segregated compartments and disposed adjacent to and on an opposite side of the switchgear enclosure from the first side vent box; a second switchgear apparatus having a second switchgear enclosure disposed adjacent to the first side vent box, the second switchgear apparatus having a lower current rating than the current rating of the central switchgear system; and a third switchgear apparatus having a third switchgear enclosure disposed adjacent to the second side vent box, the third switchgear apparatus having a lower current rating than the current rating of the central switchgear system.

In a refinement, the first side vent box includes a first plurality of vent chambers operative to conduct first cooling air to or from the first selected compartments, each vent chamber of the first plurality of vent chambers having a vent opening operative to transmit the first cooling air to or from a corresponding compartment of the first selected compartment and/or wherein the second side vent box includes a second plurality of vent chambers operative to conduct second cooling air to or from the second selected compartments, each vent chamber of the second plurality of vent chambers having a vent opening operative to transmit the second cooling air to or from a corresponding compartment of the second selected compartments.

In another refinement, the first plurality of vent chambers is a plurality of segregated vent chambers; and wherein the second plurality of vent chambers is a plurality of segregated vent chambers.

In yet another refinement, the electrical switchgear system further comprises a bottom vent box disposed at a bottom of the first switchgear enclosure and in fluid communication with third selected compartments of the plurality of segregated compartments, wherein the bottom vent box is operative to conduct cooling air to the third selected compartments.

In still another refinement, the bottom vent box includes a front face, a back face, a vent opening disposed at each of the front face and the back face, and a third plurality of vent chambers operative to conduct the cooling air to the third selected compartments; wherein each vent opening is operative to receive the cooling air into at least one adjacent vent chamber of the plurality of vent chambers.

In yet still another refinement, the third selected compartments includes a lower circuit breaker compartment and a lower cable compartment; wherein the bottom vent box is operative to supply the cooling air from the front face into the lower circuit breaker compartment; and wherein the bottom vent box is operative to supply the cooling air from the back face into the lower cable compartment.

In a further refinement, the plurality of segregated compartments includes a lower circuit breaker compartment, an upper circuit breaker compartment and an upper cable compartment; wherein the first side vent box and the second side vent box each include a front face and a back face; wherein the first side vent box and the second side vent box are operative to supply first cooling air from the front face into the lower circuit breaker compartment and the upper circuit breaker compartment; and wherein the first side vent box and the second side vent box are operative to supply second cooling air from the back face into the upper cable compartment.

In a yet further refinement, the plurality of segregated compartments includes a bus bar compartment, further comprising a center vent box disposed at least partially within the switchgear enclosure and operative to receive cooling air from in front of the switchgear enclosure and transmit the cooling air to the bus bar compartment.

In a still further refinement, the first side vent box and the second side vent box each include a top surface having a plurality of vent openings; wherein the plurality of compartments includes an upper circuit breaker compartment, a bus bar compartment, an upper cable compartment, and a lower cable compartment; and wherein the first side vent box and the second side vent box are operative to discharge cooling air from the upper circuit breaker compartment, the bus bar compartment, the upper cable compartment, and the lower cable compartment from the plurality of vent openings in the top surface of each of the first side vent box and the second side vent box.

Embodiments of the present invention include an electrical switchgear system, comprising: a switchgear enclosure having a plurality of compartments housing switchgear components; and means for transmitting cooling air in fluid communication with first selected compartments of the plurality of compartments and disposed on a side of the switchgear enclosure.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. An electrical switchgear system, comprising:
   a switchgear enclosure including a plurality of compartments housing switchgear components, the switchgear components comprising at least a circuit breaker, a cable system and a bus bar system, and wherein the plurality of compartments includes at least a circuit breaker compartment, a cable compartment and a bus bar compartment that are constructed to house at least a portion of the respective circuit breaker, cable system and bus bar system;
   a first side vent box including a first plurality of vent chambers in fluid communication with first selected compartments of the plurality of compartments and disposed on a first side of the switchgear enclosure, wherein at least one vent chamber of the first plurality of vent chambers is constructed to transmit cooling air to at least one compartment of the first selected compartments, and wherein at least another vent chamber of the first plurality of vent chambers is constructed to exhaust used cooling air from at least another compartment of the first selected compartments; and
   a second side vent box including a second plurality of vent chambers in fluid communication with second selected compartments of the plurality of compartments and disposed on an opposite side of the switchgear enclosure, wherein at least one vent chamber of the second plurality of vent chambers is constructed to transmit cooling air to at least one compartment of the second selected compartments, and wherein at least another vent chamber of the second plurality of vent chambers is constructed to exhaust used cooling air from at least another compartment of the second selected compartments.

2. The electrical switchgear system of claim 1, wherein the first selected compartments are the same as the second selected compartments.

3. The electrical switchgear system of claim 1, wherein each vent chamber of the first plurality of vent chambers has a vent opening operative to transmit the cooling air to or from a corresponding compartment of the first selected compartments.

4. The electrical switchgear system of claim 1, wherein each vent chamber of the second plurality of vent chambers has a vent opening operative to transmit the cooling air to or from a corresponding compartment of the second selected compartments.

5. The electrical switchgear system of claim 1, further comprising a bottom vent box disposed at a bottom of the first switchgear enclosure and in fluid communication with third selected compartments of the plurality of compartments, wherein the bottom vent box is oriented perpendicularly to the first side vent box and the second side vent box.

6. The electrical switchgear system of claim 5, wherein the bottom vent box includes a third plurality of vent chambers operative to conduct cooling air into the third selected compartments.

7. The electrical switchgear system of claim 6, wherein the bottom vent box includes a front face and a back face; wherein the bottom vent box includes a vent opening disposed at each of the front face and the back face; wherein each vent opening is operative to receive the cooling air into at least one adjacent vent chamber of the plurality of vent chambers.

8. The electrical switchgear system of claim 1, wherein the first side vent box and the second side vent box each include a front face and a back face; wherein the first side vent box and the second side vent box each include a vent opening disposed at each of the front face and the back face and operative to receive cooling air into at least one adjacent vent chamber a respective of the first and second plurality of vent chambers.

9. The electrical switchgear system of claim 1, further comprising a center vent box disposed at least partially within the switchgear enclosure and operative to receive cooling air from in front of the switchgear enclosure and transmit the cooling air into at least one compartment of the plurality of compartments, wherein the center vent box is oriented perpendicularly to the first side vent box and the second side vent box.

10. The electrical switchgear system of claim 1, wherein the first side vent box and the second side vent box each include a top surface in fluid communication with the plurality of compartments via at least one vent chamber of each of respective of the first plurality of vent chambers and the second plurality of vent chambers; wherein the first side vent box and the second side vent box each include a plurality of vent openings disposed in the top surface and operative to discharge used cooling air from adjacent vent chambers of the plurality of vent chambers.

11. The electrical switchgear system of claim 1, wherein the first side vent box is disposed external to the switchgear enclosure and disposed adjacent to the switchgear enclosure on the first side of the switchgear enclosure; and wherein the second side vent box is disposed external to the switchgear component and disposed on a second side of the switchgear enclosure opposite the first side of the switchgear enclosure.

12. The electrical switchgear system of claim 1, wherein both the first side vent box and the second side vent box are constructed to supply cooling air to the switchgear enclosure.

13. The electrical switchgear system of claim 1, wherein both the first side vent box and the second side vent box are constructed to exhaust used cooling air from the switchgear enclosure.

14. The electrical switchgear system of claim 1, wherein at least one of the first side vent box and the second side vent box are constructed to both supply cooling air to the switchgear compartment and to exhaust the cooling air from the switchgear compartment.

15. The electrical switchgear system of claim 1, wherein the switchgear enclosure, the first side vent box and the second side vent box are constructed to supply and exhaust cooling air for the switchgear enclosure using natural convection.

16. An electrical switchgear system, comprising:
a central switchgear apparatus having a central switchgear enclosure with a plurality of segregated compartments housing switchgear components, the central switchgear system having a current rating;
a first side vent box in fluid communication with first selected compartments of the plurality of segregated compartments and disposed adjacent to and on a first side of the switchgear enclosure;
a second side vent box in fluid communication with second selected compartments of the plurality of segregated compartments and disposed adjacent to and on an opposite side of the switchgear enclosure from the first side vent box;
a second switchgear apparatus having a second switchgear enclosure disposed adjacent to the first side vent box, the second switchgear apparatus having a lower current rating than the current rating of the central switchgear system; and
a third switchgear apparatus having a third switchgear enclosure disposed adjacent to the second side vent box, the third switchgear apparatus having a lower current rating than the current rating of the central switchgear system.

17. The electrical switchgear system of claim 16, wherein the first side vent box includes a first plurality of vent chambers operative to conduct first cooling air to or from the first selected compartments, each vent chamber of the first plurality of vent chambers having a vent opening operative to transmit the first cooling air to or from a corresponding compartment of the first selected compartment and/or wherein the second side vent box includes a second plurality of vent chambers operative to conduct second cooling air to or from the second selected compartments, each vent chamber of the second plurality of vent chambers having a vent opening operative to transmit the second cooling air to or from a corresponding compartment of the second selected compartments.

18. The electrical switchgear system of claim 17, wherein the first plurality of vent chambers is a plurality of segregated vent chambers; and wherein the second plurality of vent chambers is a plurality of segregated vent chambers.

19. The electrical switchgear system of claim 16, further comprising a bottom vent box disposed at a bottom of the first switchgear enclosure and in fluid communication with third selected compartments of the plurality of segregated compartments, wherein the bottom vent box is operative to conduct cooling air to the third selected compartments.

20. The electrical switchgear system of claim 19, wherein the bottom vent box includes a front face, a back face, a vent opening disposed at each of the front face and the back face, and a third plurality of vent chambers operative to conduct the cooling air to the third selected compartments; and wherein each vent opening is operative to receive the cooling air into at least one adjacent vent chamber of the plurality of vent chambers.

21. The electrical switchgear system of claim 20, wherein the third selected compartments includes a lower circuit breaker compartment and a lower cable compartment; wherein the bottom vent box is operative to supply the cooling air from the front face into the lower circuit breaker compartment; and wherein the bottom vent box is operative to supply the cooling air from the back face into the lower cable compartment.

22. The electrical switchgear system of claim 16, wherein the plurality of segregated compartments includes a lower circuit breaker compartment, an upper circuit breaker compartment and an upper cable compartment; wherein the first side vent box and the second side vent box each include a front face and a back face; wherein the first side vent box and the second side vent box are operative to supply first cooling air from the front face into the lower circuit breaker compartment and the upper circuit breaker compartment; and wherein the first side vent box and the second side vent box are operative to supply second cooling air from the back face into the upper cable compartment.

23. The electrical switchgear system of claim 16, wherein the plurality of segregated compartments includes a bus bar compartment, further comprising a center vent box disposed at least partially within the switchgear enclosure and operative to receive cooling air from in front of the switchgear enclosure and transmit the cooling air to the bus bar compartment.

24. The electrical switchgear system of claim 16, wherein the first side vent box and the second side vent box each include a top surface having a plurality of vent openings; wherein the plurality of compartments includes an upper circuit breaker compartment, a bus bar compartment, an upper cable compartment, and a lower cable compartment; and wherein the first side vent box and the second side vent box are operative to discharge cooling air from the upper circuit breaker compartment, the bus bar compartment, the upper cable compartment, and the lower cable compartment from the plurality of vent openings in the top surface of each of the first side vent box and the second side vent box.

25. An electrical switchgear system, comprising:
a first switchgear enclosure having a first plurality of compartments constructed to house at least a portion of first switchgear components;
a first side vent box in fluid communication with first selected compartments of the first plurality of compartments and disposed on a first side of the first switchgear enclosure;
a second side vent box in fluid communication with second selected compartments of the first plurality of compartments and disposed on an opposite side of the switchgear enclosure than the first side vent box;
a second switchgear enclosure having a second plurality of compartments constructed to house at least a portion of second switchgear components, the second switchgear enclosure being mounted adjacent to the first side vent box opposite the first switchgear enclosure;

a third switchgear enclosure having a third plurality of compartments constructed to house at least a portion of third switchgear components, the third switchgear enclosure being mounted adjacent to the second side vent box opposite the first switchgear enclosure;

a bottom vent box disposed at a bottom of the first switchgear enclosure and in fluid communication with third selected compartments of the first plurality of compartments, wherein the bottom vent box is oriented perpendicularly to the first side vent box and the second side vent box; and a center vent box disposed in the first switchgear enclosure and in fluid communication with fourth selected compartments of the first plurality of compartments, wherein the center vent box is oriented perpendicularly to the first side vent box and the second side vent box.

26. The electrical switchgear system of claim 25, further comprising:

the first switchgear components, at least a portion of which are housed in the first plurality of compartments;

the second switchgear components, at least a portion of which are housed in the second plurality of compartments; and the third switchgear components, at least a portion of which are housed in the third plurality of compartments.

27. The electrical switchgear system of claim 26, wherein the first switchgear enclosure and/or the first switchgear components have a first current rating; wherein the second switchgear enclosure and/or the second switchgear components have a second current rating; wherein the third switchgear enclosure and/or the third switchgear components have a third current rating; and wherein the first current rating is higher than the second current rating and/or higher than the third current rating.

* * * * *